United States Patent
Hsu et al.

(10) Patent No.: US 7,099,974 B2
(45) Date of Patent: Aug. 29, 2006

(54) METHOD, APPARATUS, AND SYSTEM FOR REDUCING RESOURCE CONTENTION IN MULTIPROCESSOR SYSTEMS

(75) Inventors: Yu-Cheng Hsu, Tucson, AZ (US); John Norbert McCauley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 10/393,320

(22) Filed: Mar. 20, 2003

(65) Prior Publication Data

US 2004/0186864 A1 Sep. 23, 2004

(51) Int. Cl.
*G06F 12/00* (2006.01)

(52) U.S. Cl. ...................... 710/240; 710/242
(58) Field of Classification Search ................. 710/118
See application file for complete search history.

(56) References Cited

U.S. PATENT DOCUMENTS

| | | | | |
|---|---|---|---|---|
| 4,135,240 A * | 1/1979 | Ritchie | ...................... | 711/164 |
| 5,193,167 A | 3/1993 | Sites et al. | .................. | 395/425 |
| 5,802,295 A | 9/1998 | Fukui et al. | ........... | 395/200.46 |
| 5,835,946 A | 11/1998 | Allen et al. | .................. | 711/122 |
| 5,933,261 A | 8/1999 | Fukui et al. | ................ | 359/125 |
| 6,041,383 A * | 3/2000 | Jeffords et al. | ............. | 710/200 |
| 6,073,211 A | 6/2000 | Cheng et al. | ............... | 711/122 |
| 6,081,859 A * | 6/2000 | Munguia | ..................... | 710/107 |
| 6,240,498 B1 | 5/2001 | Dickes et al. | ............... | 711/170 |
| 6,247,025 B1 | 6/2001 | Bacon | ........................ | 707/206 |
| 6,275,907 B1 | 8/2001 | Baumgartner et al. | ...... | 711/143 |
| 6,353,869 B1 * | 3/2002 | Ofer et al. | ................... | 710/200 |
| 2003/0101400 A1 * | 5/2003 | Anjo et al. | ................. | 714/749 |

OTHER PUBLICATIONS

W.A. Kirke, L.A. McMahon and J.J. Vriezen, Atomic Linked List Insert For Power-PC Mulit-Processor With Large Reservation Granules, IBM Technical Disclosure Bulletin, vol. 37 No. 12 Dec. 1994 p. 207.
L.J. Merkel, C.R. Moore, M.T. Vaden, and J.L. Wilson, LARX/STCX Interlocks and Broadcast, IBM Technical Disclosure Bulletin, vol. 37 No. 02B Feb. 1994 p. 629.

* cited by examiner

Primary Examiner—John R. Cottingham
Assistant Examiner—Matthew Spittle
(74) Attorney, Agent, or Firm—Kunzler & Associates

(57) ABSTRACT

A delay interval is calculated for a processor that attempts to reserve a reserved shared resource in a multiprocessing system. The delay interval is based on the relationship of a requesting processor and a reservation holding processor. Each delay interval is unique without consistent bias against a processor. The requesting processor queries the reservation status of a shared resource without invalidating an existing reservation. If a shared resource is reserved, the requesting processor waits for an amount of time corresponding to the delay interval before again attempting to reserve the shared resource. The present invention substantially reduces arbitration conflicts within multiprocessor systems.

20 Claims, 6 Drawing Sheets

METHOD, APPARATUS, AND SYSTEM FOR REDUCING RESOURCE CONTENTION IN MULTIPROCESSOR SYSTEMS

BACKGROUND OF THE INVENTION

1. The Field of the Invention

The invention relates to methods, apparatus, and systems for resource arbitration. Specifically, the invention relates to methods, apparatus, and systems for reducing resource contention in multiprocessor systems.

2. The Relevant Art

The processing power of a computing system can be increased by employing multiple processors to share data processing tasks of the computing system. Although each processor may have its own dedicated resources, processors may also share system resources such as cache memory, main memory, communication buses, and peripheral devices. While completing their respective tasks, two or more processors will often concurrently request use of the same resource. For example, a processor may attempt to write data to a line of memory while another processor is concurrently attempting to read the same line of memory. The two processors must then arbitrate access to the line of memory.

Current arbitration methods allow a processor to reserve or secure a resource such as a line of memory. When a second requesting processor attempts to reserve a resource that is currently reserved by a first reservation holding processor, the second requesting processor is denied a reservation. The second requesting processor must make a subsequent reservation request.

In some cases, if a second requesting processor subsequently attempts to reserve a resource before the first reservation holding processor has released the resource, the first processor may lose its reservation and the second processor may be denied a reservation in order to maintain data integrity. Both processors must then arbitrate again for use of the resource. In some cases, multiple attempts to reserve the shared resource may be required in order to resolve the contention and allow each processor to access the shared resource and complete their tasks.

Another current method of arbitrating access to a resource involves calculating a random delay interval for each processor. Calculating a random delay interval reduces processor contention for a shared resource, but requires additional hardware or software complexity and produces an arbitrary distribution of delay intervals.

Still another current method of arbitrating access to a resource is to assign some processors higher priority for accessing a resource, or to lower the priority of some processors. Assigning different priority levels reduces contention, but often is biased against individual processors in the system, preventing all processors from completing their tasks as efficiently as possible.

What is needed is a method, apparatus, and system for reducing the contention for shared resources in multiprocessor systems. What is particularly needed is a method, apparatus, and system that delays a processors attempts to access a shared resource in order to minimize contention. The delay interval would preferably be unique to each processor, calculated with little computational overhead, and unbiased in providing access to resources. Such a method, apparatus, and system would provide efficient access to shared resources in an equitable manner.

SUMMARY OF THE INVENTION

The methods, apparatus and systems of the present invention have been developed in response to the present state of the art, and in particular, in response to the problems and needs in the art that have not yet been fully solved by currently available data processing means and methods. Accordingly, the present invention provides an improved method, apparatus, and system for arbitrating access to shared resources in multiprocessor systems.

In one aspect of the present invention, a method for arbitrating access to a shared resource involves assigning unique numeric identifiers to each processor in a multiprocessing environment, detecting a reservation of a shared resource by a reservation holding processor, and delaying access requests for the shared resource for a calculated delay interval. The calculated delay interval is based on a mathematical relationship of the numeric identifiers of a requesting processor and a processor currently holding the reservation of a shared resource. In one embodiment of the present invention, a delay interval is calculated as the difference of a requesting processor's and a reservation holding processor's numeric identifiers multiplied by a scaling factor and summed with a delay constant. The same algorithm can be used to calculate a unique delay interval for each subsequent processor that is denied access to a shared resource.

Delay intervals are calculated to minimize multiple processors attempting to simultaneously access a reserved resource. Each delay interval is based upon the difference of the numeric identifiers of the requesting processor and the reservation holding processor. Computing the difference of numeric identifiers provides delay intervals that are unique and unbiased towards any particular processor.

In another aspect of the present invention, an apparatus manages access to a shared resource in a multiprocessing system with unique numeric identifiers assigned to each processor. Arbitration logic detects that a shared resource needed by a requesting processor is reserved by a reservation holding processor. If the desired resource is reserved, a unique delay interval is calculated based on a mathematical relationship of the numeric identifiers of the requesting processor and a reservation holding processor. The requesting processor refrains from attempting to reserve the desired resource until the delay interval has elapsed.

Various elements of the present invention are combined into a system for arbitrating access to shared resources. A processor requesting a shared resource employs arbitration logic to determine if another processor holds the reservation for a shared resource. If the shared resource is not reserved, the arbitration logic allows the requesting processor to reserve the shared resource.

If the shared resource is reserved, the arbitration logic prevents the requesting processor from invalidating the reservation and the requesting processor refrains from making a subsequent attempt to reserve the shared resource until a delay interval has elapsed. In one embodiment, the delay interval is computed by a delay interval module that is centrally shared. In another embodiment, delay intervals are computed by modules local to each processor.

The computed delay intervals are based on a mathematical relationship of the numeric identifiers of the processors attempting to access the shared resource. A reservation holding processor releases its reservation of a shared resource when it has completed accessing the resource.

The present invention increases processing efficiency by reducing contention for access to shared resources. The present invention further increases efficiency by calculating each processor's delay interval for restraining reservation requests to a shared resource in a rapid, deterministic manner. Access priority may be unbiased, allowing processors to complete tasks symmetrically with a minimum amount of delay for dependent processes.

The various aspects of the present invention provide resource arbitration methods and means that resolve resource contention in an unbiased and economical manner. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
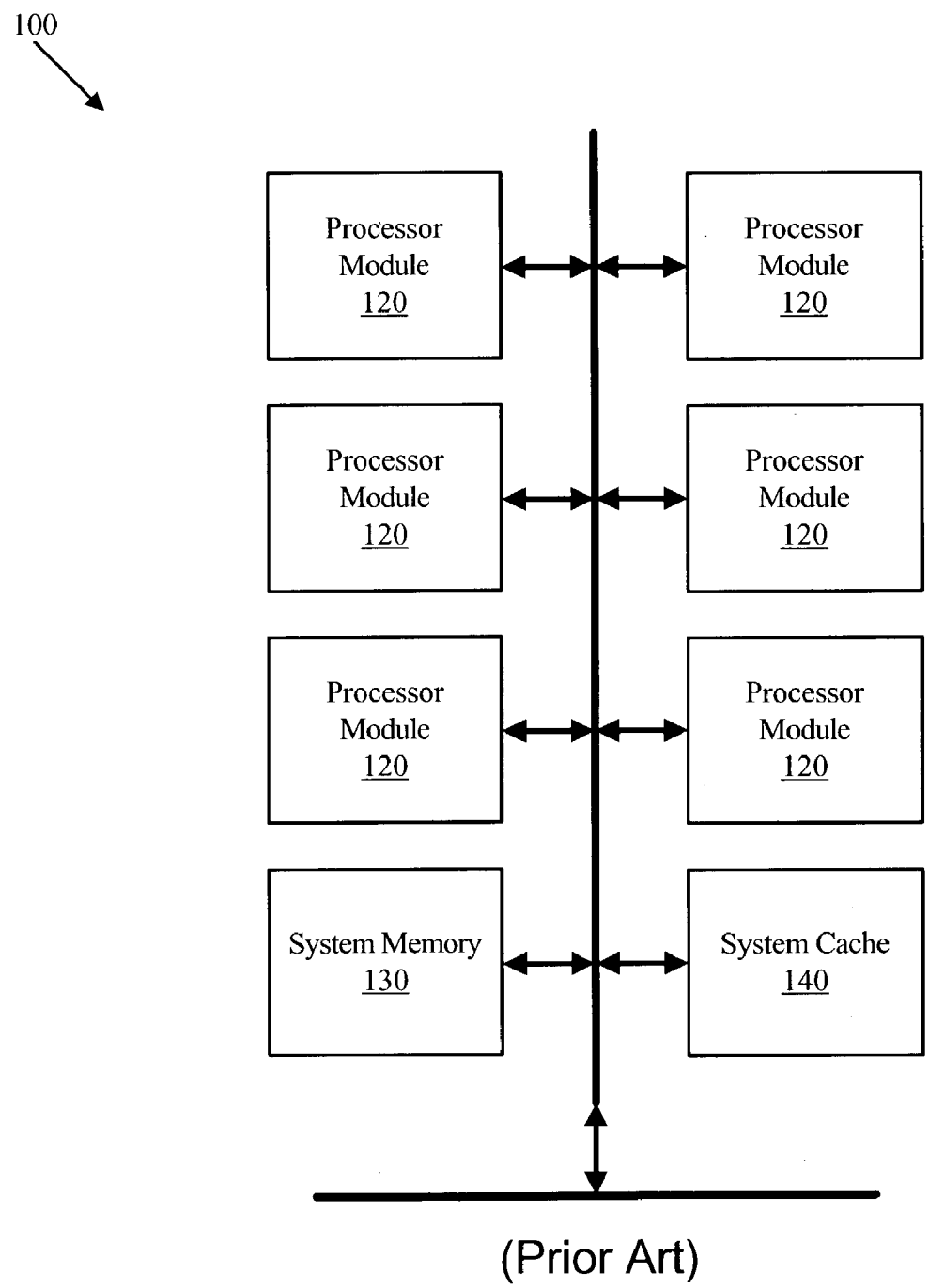
FIG. 1 is a block diagram illustrating a representative multi-processor system in which the present invention may be deployed.

FIG. 1 is a block diagram illustrating a representative multi-processor system in which the present invention may be deployed. The depicted multi-processor system 100 includes one or more processor modules 120, a system memory 130, and a system cache 140. The processor modules 120 retrieve instructions and data from the system memory 130 or the system cache 140. Processed data or instructions to peripherals are dispatched from processor modules 120 to the system memory 130, the system cache 140.

Figure 2:
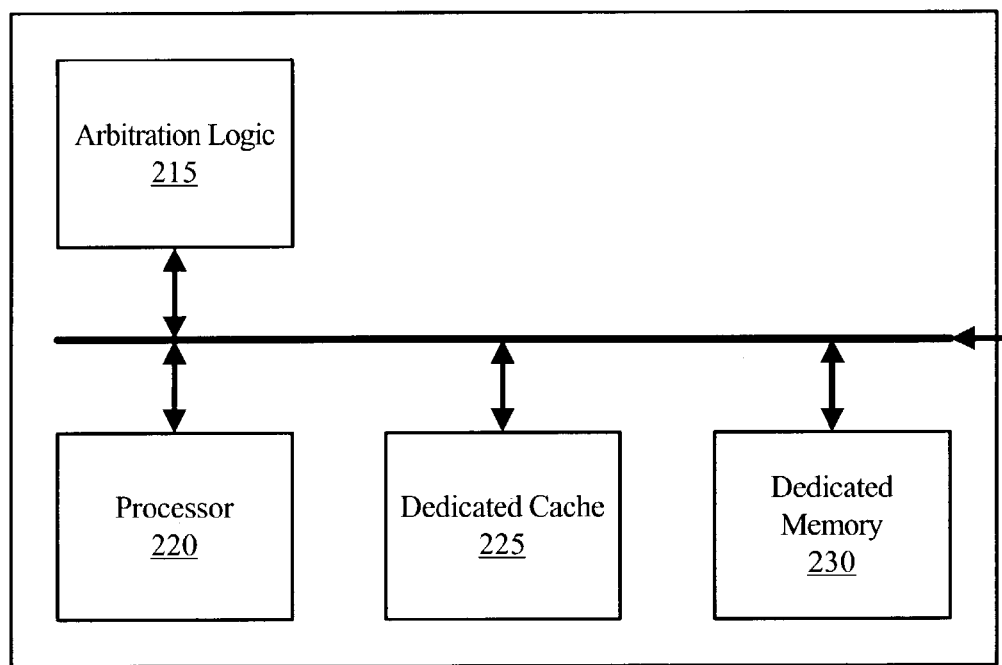
FIG. 2 is a block diagram illustrating one embodiment of a processor module in accordance with the present invention.

FIG. 2 is a block diagram illustrating one embodiment of a processor module 200 in accordance with the present invention. The depicted processor module 200 includes an arbitration logic module 215, a processor or processor core 220, a dedicated cache 225, and a dedicated memory 230.

The processor module 200 processes data and commands using local dedicated resources and non-local shared system resources. As depicted, the processor module 200 has exclusive use of dedicated resources. However, the processor module 200 must arbitrate for access to shared system resources such as the system memory 130 or the system cache 140.

Figure 3:
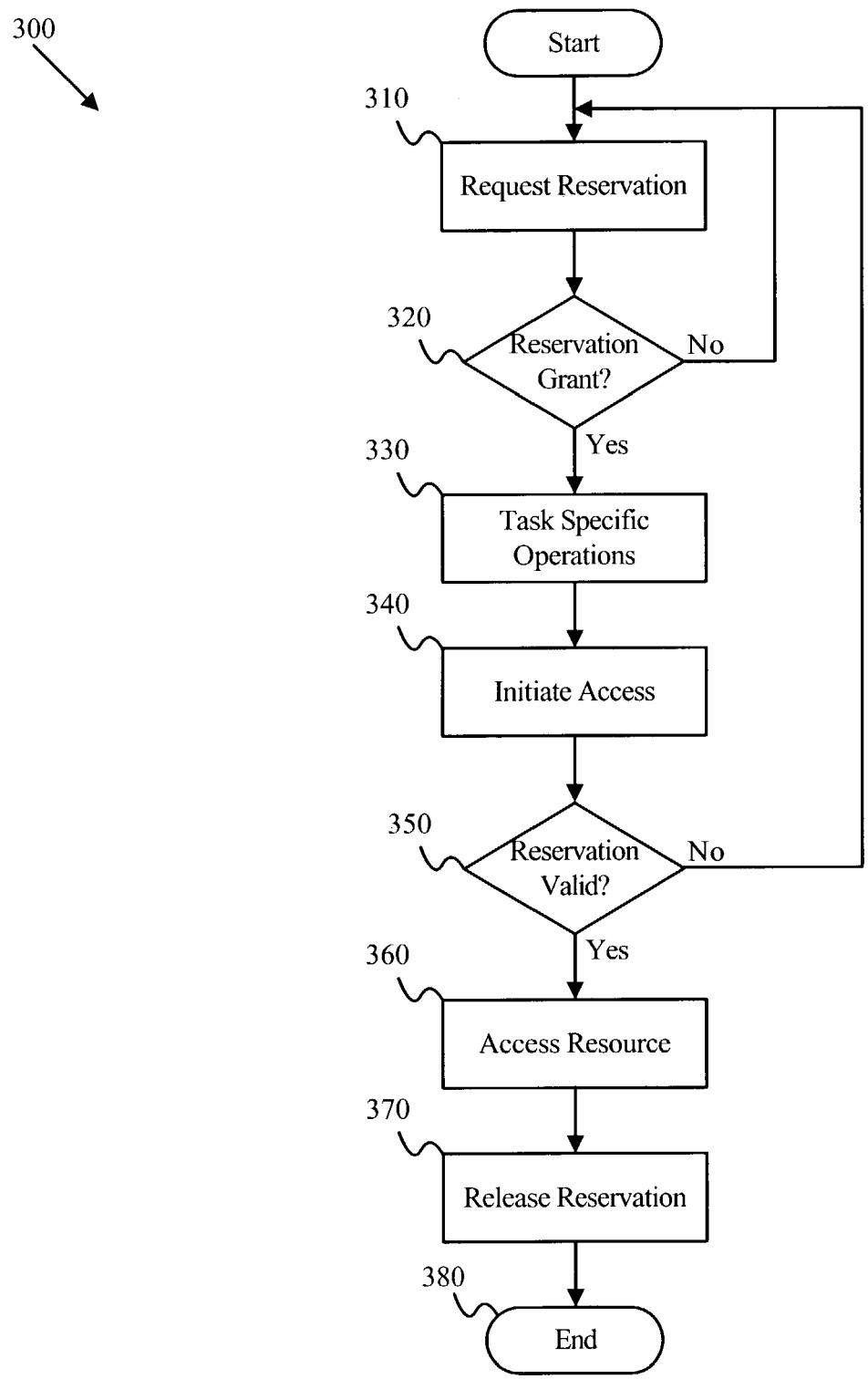
FIG. 3 is a flow chart illustrating one embodiment of a prior art resource arbitration method.

FIG. 3 is a flow chart illustrating one embodiment of a resource arbitration method 300 in accordance with the present invention. Each processor module 200 in the multi-processor system 100 may employ the resource arbitration method 300 to arbitrate access to shared resources. The resource arbitration method 300 includes a request reservation step 310, a reservation grant test 320, a task specific operations step 330, an initiate access step 340, a reservation valid test 350, an access resource step 360, a release reservation test 370, and an end step 380.

The request reservation step 310 requests permission to access a shared resource. The reservation grant test 320 determines if a shared resource is reserved. If the shared resource is unreserved, the arbitration method 300 proceeds to the task specific operations step 330. If the shared resource is reserved, the arbitration method 300 loops to the request reservation step 310.

In one embodiment, the request reservation step 310 voids an existing reservation for the shared resource by a reservation holding processor. Both a reservation holding processor and a requesting processor must then request a new reservation. The processors' subsequent requests for reservations may contend with each other, preventing either processor from establishing a reservation. The resulting resource contention slows overall system performance.

The task specific operations step 330 completes operations specific to the process that is being executed by the processor module 200. Typically the operations are performed when the processor has a reservation for the shared resource needed to complete the task.

The initiate access step 340 queries a shared resource to determine if the processor module 200 still has a reservation to complete access to the shared resource. The reservation valid test 350 determines a reservation status of a shared resource. If a reservation is still valid, the arbitration method 300 proceeds to the access resource step 360. If the reservation is not valid, the arbitration method 300 loops to the request reservation step 310.

If a reservation is no longer valid, for example when an alternate processor has requested a reservation for the shared resource, the processor module 200 must again arbitrate for the shared resource to complete its task. In an alternate embodiment, a reservation is never invalidated and the arbitration method 300 always proceeds from the reservation valid test 350 to the access resource step 360.

The access resource step 360 accesses a shared resource reserved by a processor. Accessing a resource may include reading from or writing to the resource. The release reservation step 370 releases a processor module's 200 reservation of a shared resource. Other processors may subsequently reserve the resource. In response to completion of the reservation step 370, the depicted arbitration method 300 terminates with the end step 380.

Figure 4:
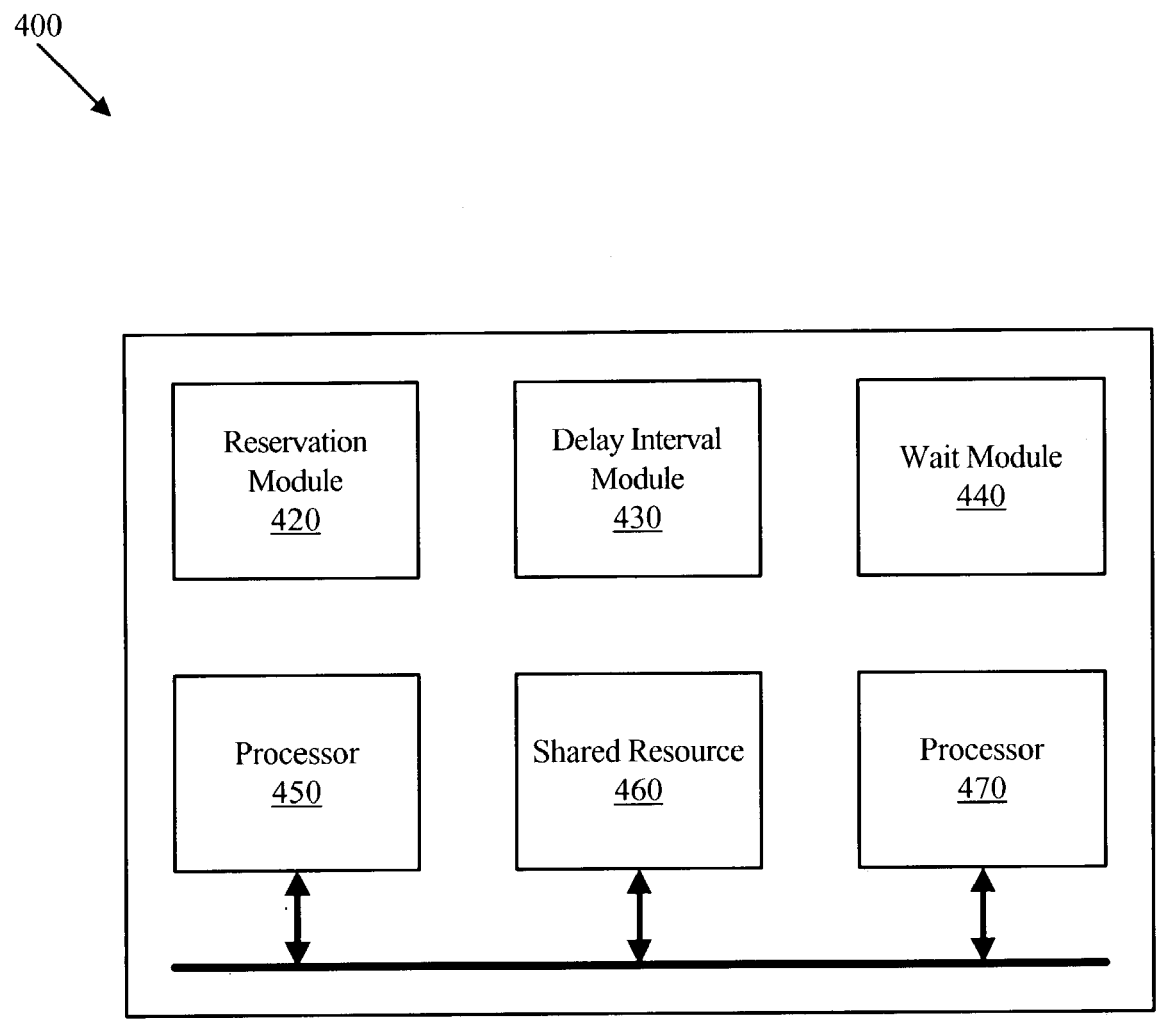
FIG. 4 is a block diagram illustrating one embodiment of a multi-processing system configured to arbitrate resource contention of the present invention.

FIG. 4 is a block diagram illustrating one embodiment of a multi-processing system 400 configured to arbitrate resource contention of the present invention. The depicted system 400 includes a reservation module 420, a delay interval module 430, a wait module 440, two or more processors 450 and 470, and a shared resource 460. Although for the purposes of clarity the multiprocessor system 400 is depicted with two processors 450, 470, and one shared resource 460, a multiprocessor system 400 may have any number of processors and shared resources.

A requesting processor 450 that needs to access a shared resource 460 invokes a reservation module 420. The reservation module 420 determines if a shared resource 460 is reserved by a processor such as the reservation holding processor 470. The reservation module 420 determines the reservation status of a shared resource 460 without invalidating an existing reservation.

If a shared resource 460 has not been reserved, the reservation module 420 reserves the shared resource 460 for the requesting processor 450. If the shared resource 460 has been reserved, the delay interval module 430 calculates a unique delay interval using the relationship of the reservation holding processor 470 and the requesting processor 450.

The requesting processor 450 refrains from attempting to reserve a reserved shared resource 460 until the wait module 440 determines that the delay interval has elapsed. Subsequent to the elapse of the delay interval, the requesting processor 450 invokes the reservation module 420 to determine the reservation status of the shared resource 460.

If the shared resource 460 is reserved, the delay interval module 430 calculates a delay interval. The calculated delay interval is based on a mathematical relationship of numeric identifiers of a requesting processor and a reservation holding processor. The requesting processor 450 refrains from reserving the shared resource 460 until the wait module 440 determines the delay interval has elapsed.

If a shared resource 460 is not reserved, the reservation module 420 reserves the shared resource 460 for a requesting processor 450. The processor 450 uses the shared resource 460 to complete its task. The processor 450 and the reservation module 420 may then release the reservation of the shared resource 460.

Figure 5:
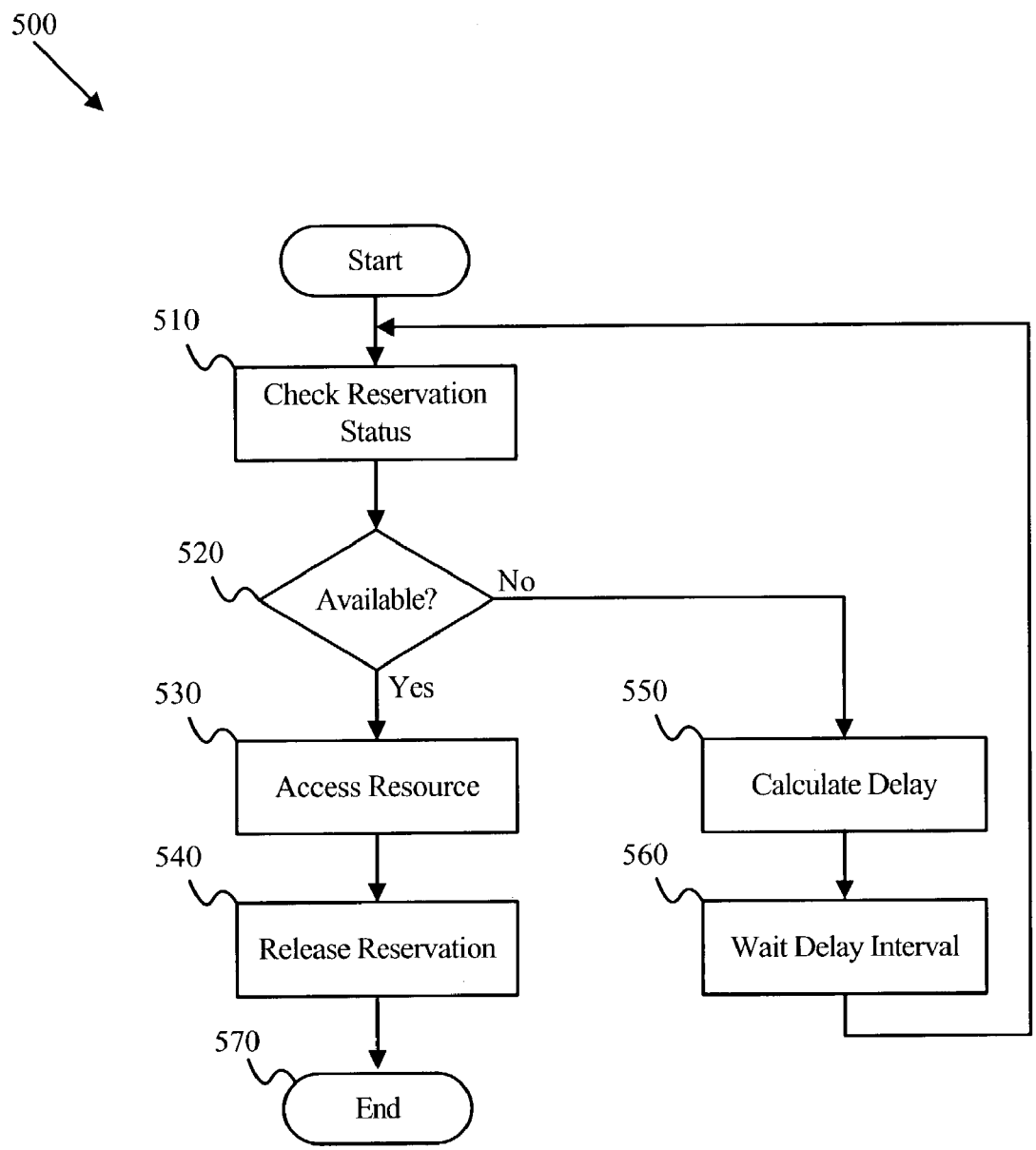
FIG. 5 is a flow chart illustrating one embodiment of a resource arbitration method of the present invention.

FIG. 5 is a flow chart illustrating one embodiment of a resource arbitration method 500 of the present invention. The resource arbitration method 500 facilitates efficient resolution of shared resource contention in a multi-processor system such as the multi-processor system 100.

The depicted arbitration method 500 includes a check resource status step 510, a resource available test 520, an access resource step 530, a release reservation step 540, a calculate delay step 550, a wait delay interval step 560, and an end step 570. Although for clarity purposes the steps of the arbitration method 500 are depicted in a certain sequential order, execution within an actual system may be conducted in parallel and not necessarily in the depicted order.

The arbitration method 500 may be conducted in conjunction with, or independent from, the processor module 200 and the multi-processing system 100. The check resource status step 510 queries a shared resource 460 to determine if the resource 460 is reserved by a reservation holding processor. The shared resource 460 may be queried without invalidating an existing reservation. If the shared resource 460 is a line of memory, the resource status step 510 may refrain from loading the line in dedicated cache 225 or dedicated memory 230.

The resource available test 520 determines if a shared resource 460 is reserved. If the resource available test 520 determines that the shared resource 460 is reserved, the arbitration method 500 skips to the calculate delay step 550. If the shared resource 460 is not reserved, the arbitration method 500 proceeds to the access resource step 530.

The access resource step 530 reserves a shared resource 460 for a processor module 200. The processor module 200 may access the shared resource 460 to complete its task. The release reservation step 540 releases a processor module's 200 reservation of a shared resource 460. The arbitration method 500 then terminates with the end step 570.

The calculate delay step 550 calculates a delay interval. The delay interval is based on the relationship of a requesting processor module 200 and a reservation holding processor. In one embodiment, each processor is assigned a unique numeric identifier. The delay interval relationship is the difference of the numeric identifiers of the requesting and reservation holding processors. Using the difference of the numeric identifiers facilitates unique delay intervals for each combination of processors. As a result, no processor is consistently biased against with a long delay interval.

The wait delay interval step 560 restrains a requesting processor module 200 from attempting to access a shared resource 460 until a delay interval has elapsed. After the delay interval has elapsed, the method loops to the check resource status step 510 in order to ascertain the availability of the shared resource 460.

Equation 1 illustrates one embodiment of a delay interval algorithm of the present invention. The equation facilitates the calculation of a unique delay interval for a processor module 200 that has requested access to a reserved shared resource 460. Although for clarity purposes the depicted equation is shown in its most basic form, additional terms, conditions, and operations may be added to refine performance.

$$d = c_1 * (x-y) + c_2 \qquad \text{Equation 1}$$

Where d=the delay interval, $c_1$=the scaling factor, x=the first processor identifier, y=the second processor identifier, and $c_2$=the delay constant.

Equation 2 illustrates one alternate embodiment of a delay interval algorithm of the present invention. The equation facilitates the calculation of a delay interval for a processor module 200 that has requested access to a reserved shared resource 460.

$$d = c_1 * (x-y) + (c_2 + n) \qquad \text{Equation 2}$$

Where d=the delay interval, $c_1$=the scaling factor, x=the first processor identifier, y=the second processor identifier, $c_2$=the delay constant, and n=the queuing number, specifying the order of the requesting processor's reservation request relative to other requesting processors.

Figure 6:
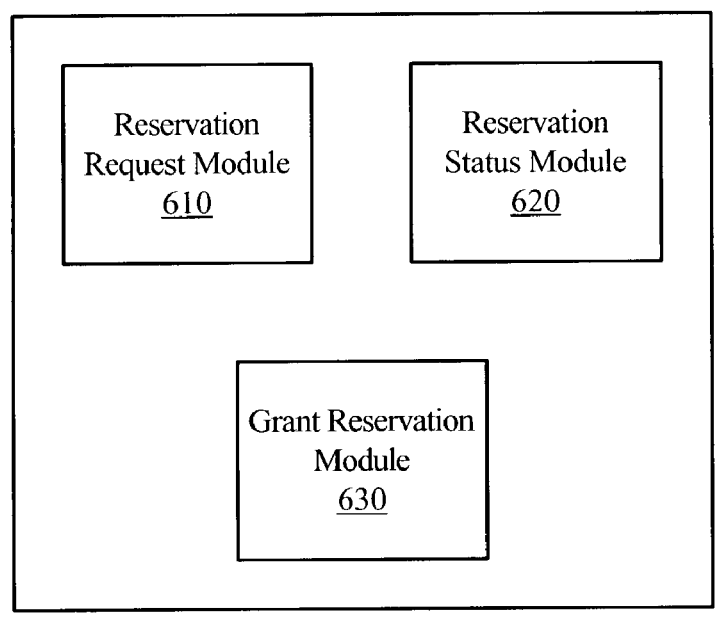
FIG. 6 is a block diagram illustrating one embodiment of a reservation module of the present invention.

FIG. 6 is a block diagram illustrating one embodiment of a reservation system 600 configured to manage the reservation status of a shared resource 460. The depicted reservation system 600 includes a reservation request module 610, a reservation status module 620, and a grant reservation module 630. The depicted reservation system 600 grants or denies reservations for a shared resource 460 to requesting processor modules 200.

The reservation request module 610 receives requests from a processor for a shared resource 460 reservations. The reservation status module 620 determines the reservation status of a shared resource 460. If the shared resource 460 is available, the grant reservation module 630 grants a reservation. If a shared resource 460 is reserved, the grant reservation module 630 denies a reservation.

The present invention improves the access of processors to shared resources in a multiprocessing system by calculating a unique delay interval for each processor that requests a reserved shared resource. The delay intervals are efficient to calculate and not biased against any one processor. Each requesting processor waits a unique delay interval before attempting to request a reserved shared resource, thereby reducing contention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for arbitrating access to a shared resource in a multiprocessing system, the method comprising:
   detecting a reservation of a shared resource by a reservation holding processor, the reservation holding processor having a first numeric identifier;
   calculating a delay interval for a requesting processor, the requesting processor having a second numeric identifier, the delay interval based on a mathematical relationship of only the first and second numeric identifiers and no more than two constant values; and
   delaying attempts to reserve the shared resource for the calculated delay interval.

2. The method of claim 1, further comprising calculating an additional delay interval based on a mathematical relationship of only the first numeric identifier and numeric identifiers of subsequent requesting processors and no more than two constant values.

3. The method of claim 1, wherein the mathematical relationship comprises a mathematical difference of the first and second numeric identifiers.

4. The method of claim 1, wherein the delay interval is substantially equal to the mathematical difference of the first and second numeric identifiers multiplied by a scaling factor and summed with a delay constant.

5. The method of claim 1, wherein the delay interval is unbiased towards any processor.

6. The method of claim 1, further comprising reserving a shared resource prior to accessing the shared resource.

7. The method of claim 1, further comprising releasing a shared resource reservation.

8. The method of claim 1, further comprising determining a shared resource's reservation status without invalidating an existing reservation.

9. An apparatus for arbitrating access to shared resources in a multiprocessing system, the apparatus comprising:
   a plurality of processors configured with unique numeric identifiers;
   a reservation module configured to detect a reservation for a shared resource;
   a delay interval module configured to calculate a delay interval based on a mathematical relationship of only numeric identifiers of a requesting processor and a reservation holding processor and no more than two constant values.

10. The apparatus of claim 9, further comprising logic for detecting the reservation status of a shared resource without invalidating existing reservations.

11. An apparatus for granting access to shared resources in a multiprocessing system, the apparatus comprising:
   a reservation request module configured to receive a request for a shared resource reservation;
   a reservation status module configured to stare a shared resource's reservation status;
   a grant reservation module configured to grant a reservation for a shared resource; and
   the grant reservation module further configured to initiate calculation of a delay interval by a requesting processor, the delay interval based on a mathematical relationship of only numeric identifiers of a requesting processor and a reservation holding processor and no more than two constant values.

12. The apparatus of claim 11, the apparatus further comprising arbitration logic to deny subsequent requests for a shared resource reservation subsequent to granting a reservation to a first processor.

13. The apparatus of claim 11, further comprising logic to release a reservation for a shared resource.

14. An apparatus for arbitrating access to shared resources in a multiprocessing system, the apparatus comprising:
   means for reserving access to a shared resource;
   means for detecting a shared resource reservation;
   means for calculating a unique delay interval based on a mathematical relationship of only numeric identifiers of a requesting processor and a reservation holding processor and no more than two constant values; and
   means for refraining from requesting a shared resource until the expiration of a delay interval.

15. The apparatus of claim 14, the apparatus further comprising means for releasing a shared resource reservation.

16. A system for arbitrating access to shared resources, the system comprising:
   a plurality of processors configured with unique identifiers;
   a shared resource configured to be accessed by at least two processors;
   a reservation module configured to determine the reservation status of a shared resource;
   a delay interval module configured to calculate a unique delay interval, the delay interval based on a mathematical relationship only a requesting processor identifier and a reservation holding processor identifier and no more than two constant values; and a wait module configured to postpone by a unique delay interval a processor's request for a shared resource reservation.

17. The system of claim 16, wherein processors requesting a reservation of a shared resource do not invalidate an existing reservation.

18. A computer readable storage medium comprising computer readable program code for arbitrating access to shared resources in a multiprocessing system, the program code configured to:

test the reservation status of a resource;

calculate a delay interval as substantially equal to the mathematical difference of a first numeric identifier of a reservation holding processor and a second numeric identifier of a requesting processor multiplied by a scaling factor and summed with a delay constant; and delay reservation requests of the requesting processor for the delay interval.

19. The computer readable storage medium of claim 18, wherein the computer readable code is further configured to reserve a shared resource reservation.

20. The computer readable storage medium of claim 18, wherein the computer readable program code is further configured to release a shared resource reservation.

* * * * *

UNITED STATES PATENT AND TRADEMARK OFFICE
CERTIFICATE OF CORRECTION

PATENT NO. : 7,099,974 B2
APPLICATION NO. : 10/393320
DATED : August 29, 2006
INVENTOR(S) : Yu-Cheng Hsu It is certified that error appears in the above-identified patent and that said Letters Patent is hereby corrected as shown below:

Column 8
    Line 23, reads "to stare a" should read --to store a--

Signed and Sealed this

Fifth Day of December, 2006

JON W. DUDAS
*Director of the United States Patent and Trademark Office*